F. HEATON.
MEANS FOR USE IN THE INSERTION OF RIGID FITTINGS WITHIN RUBBER RINGS OR CYLINDERS.
APPLICATION FILED FEB. 14, 1920.
1,362,308.
Patented Dec. 14, 1920.
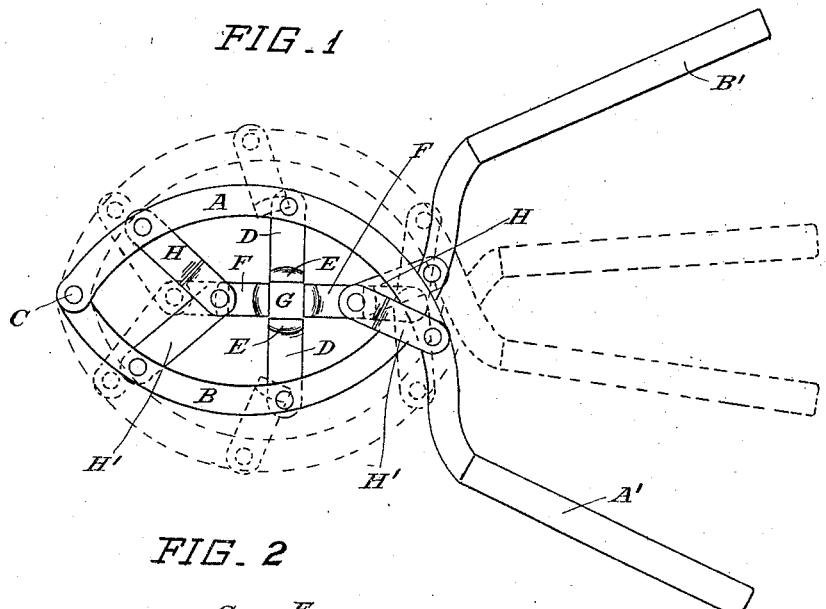
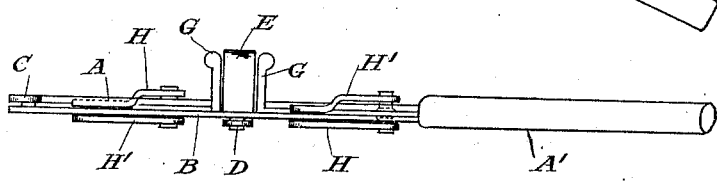
Inventor:
Frederick Heaton
By Lawrence Langner
Attorney.

UNITED STATES PATENT OFFICE.

FREDERICK HEATON, OF MATATOKI, NEW ZEALAND.

MEANS FOR USE IN THE INSERTION OF RIGID FITTINGS WITHIN RUBBER RINGS OR CYLINDERS.

1,362,308.  Specification of Letters Patent.  Patented Dec. 14, 1920.

Application filed February 14, 1920. Serial No. 358,678.

*To all whom it may concern:*

Be it known that I, FREDERICK HEATON, subject of the King of Great Britain, residing at Matatoki, New Zealand, have invented new and useful Improvements in Means for Use in the Insertion of Rigid Fittings within Rubber Rings or Cylinders; and I do hereby declare the following to be a full, clear, and exact description of the same.

This invention has been devised specially for use in connection with milking machine teat cups of certain classes, and with the object of facilitating the assembly together of certain parts of the cup into working conditions.

With a large number of teat cups rubber inflations or linings are employed, and these are in many cases attached at their upper ends to metallic or other rings for securing such ends to the corresponding ends of the teat cup casings, while in other classes, these ends are secured to rigid tubular mouthpieces of certain designs, in both instances the rubber being held to the article concerned by being stretched out to receive it and then to close upon and grip it by the resiliency of the rubber concerned. In some cases also, mouthpiece rubber rings or washers are similarly stretched over metallic mouthpiece rings so as to be held thereon.

In all cases considerable difficulty is generally experienced in stretching the rubber and holding it in the stretched condition to receive the rigid fitting, especially when the rubber is new. The present invention has therefore been devised with the object of providing an appliance by means of which the rubber article may be distended, held distended while the rigid fitting is inserted in its place, and then released so as to close upon such fitting and hold it in the required manner.

The said device is illustrated in the accompanying drawings, in which:—

Figure 1 is a plan, and

Fig. 2 a side elevation thereof.

The appliance is formed by a pair of semi-elliptical arms A—B pivoted together at one end as at C, so that they extend with their concave edges opposite one another and inclose an elliptical space between them. The free ends of the two arms are carried around so that they overlap one another and are each then extended into handles A' and B' respectively, that extend in lines approximately radial with the pivot C. These handles when moved apart, will thus draw the arms A and B in toward one another, and when moved together, will open the arms outward from one another.

Attached to each arm at a suitable point in its length, and extending inward toward the center of the space inclosed by the arms, is a link D the inner end of which is turned up to form the upwardly projecting lug E. These two links D are arranged to extend inward toward one another so as to position their lugs E respectively opposite to each other, the two links extending across the minor axis of the elliptical space between the arms A and B.

Arranged along the major axis of such space are two similarly shaped links F that extend inward from the opposite ends of such space so as to approach one another at their inner ends and to position the lugs G, formed on such ends, opposite to one another along the said axis. Each of these links, at its outer end, is attached by pivoting to a pair of toggle levers H, H', the respective levers of which pair are then pivoted to the two arms A and B.

Consequently, by the opening and closing movements of the two arms, the links D are caused to recede from and approach one another, and also through the operations of the toggle levers H, H', the links F are caused to move away from or toward each other in the line of the major axis of the elliptical space. Thus the links will, when the arms are moved inward, come together and engage one another, as shown by the full lines in Fig. 1, but when the arms are opened out, by drawing the handles A' and B' together, the link ends will all move out from a common center and away from one another as shown by the dotted lines in such figure. The positions of the links and toggle levers upon the arms are preferably so disposed that the in and out movement of all of them will be equal for a given movement of the arms.

The lugs E and G are preferably shaped on their outer surfaces so that when they come together they will form a circle, and each one is also so shaped that its upper end will have a knob on its outside surface, as shown in Fig. 2.

Consequently when the arms are closed to bring the lugs together, a rubber ring or cylinder or the like may be placed over the lugs, and then, when the arms are opened out in the manner referred to, these lugs will engage with the inside of such article and distend it in accordance with the amount of movement of the arms. The knobs on the lugs will serve to prevent the lugs slipping out of the encircling rubber.

When a rubber article has been thus distended, as for instance the end of a tubular teat cup inflation, the metallic fitting may be inserted into the distended mouth from the other side of the appliance, passing in between the lugs. Then by allowing the arms to close, the rubber will close in on to such fitting and grip it within it in the required manner, and the device removed leaving the fitting in the position required.

I claim:—

1. An appliance for the purposes described formed by a pair of curved arms arranged to curve relatively outward from one another so as to inclose a space between them and pivoted together at one end so as to be capable of opening and closing a link pivoted to each arm and extending laterally across such space and in the same line with that upon the other arm, a link extending inward from each end of such space in the same line longitudinally as the one at the other end, a pair of toggle-levers for each of the latter links the respective members of which are pivoted to the corresponding link and to the two arms, and a lug upon the inner end of each link projecting upward thereon, substantially as specified.

2. An appliance for the purposes described, comprised by a pair of curved arms arranged to curve relatively outward from one another so as to inclose a space between them, pivoted together at one end so as to be capable of opening and closing, and a series of links pivotally attached to such arms and extending relatively inward in the space inclosed thereby so as to engage one another when the arms are brought together and to move relatively outward from one another when the arms are turned out, each of such links being formed at its inner end with an upwardly extending lug, substantially as specified.

In testimony whereof, I have signed this specification in the presence of two subscribing witnesses.

FREDERICK HEATON.

Witnesses:
DAVID BROWN HUTTON,
WILLIAM ERNEST HUGHES.